UNITED STATES PATENT OFFICE.

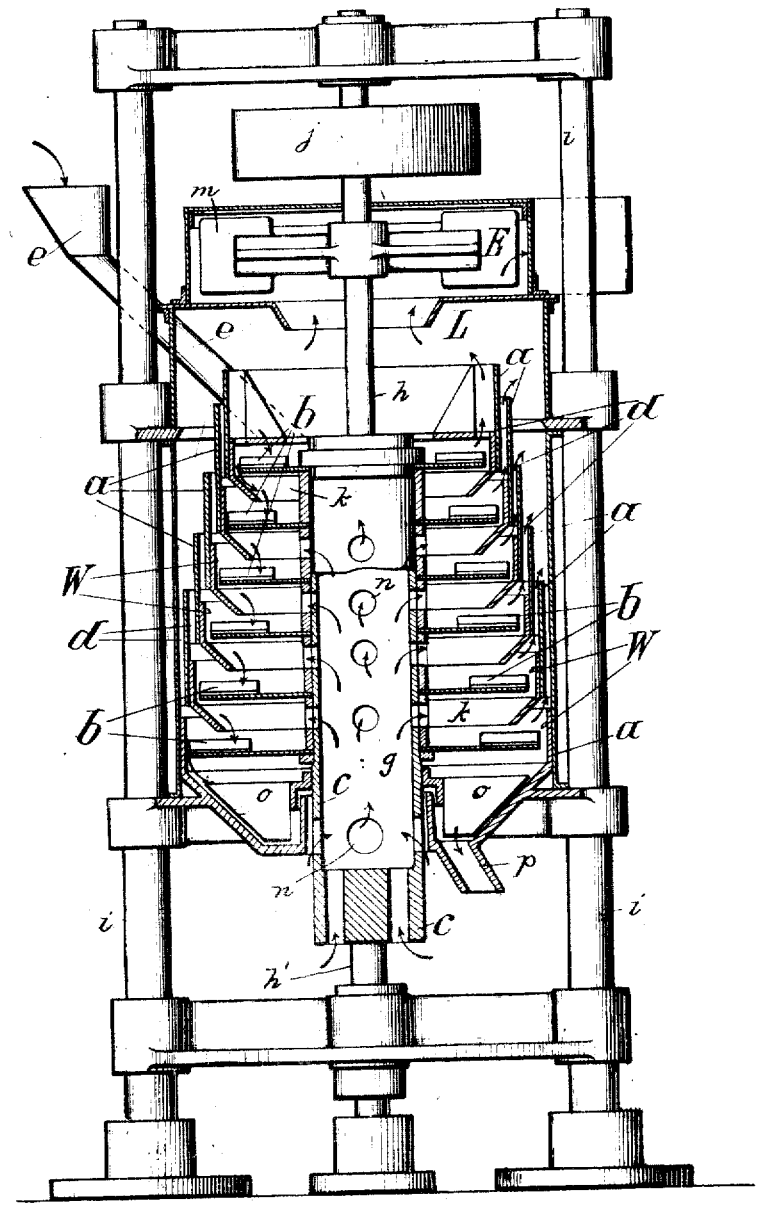

FRITZ MÜLLER, OF ESSLINGEN, GERMANY.

CENTRIFUGAL GRAIN-CLEANER.

No. 916,757.

Specification of Letters Patent.

Patented March 30, 1909.

Application filed February 1, 1908. Serial No. 413,836.

*To all whom it may concern:*

Be it known that I, FRITZ MÜLLER, a citizen of the German Empire, residing at Esslingen, in the Kingdom of Würtemberg, Empire of Germany; have invented certain new and useful Improvements in Centrifugal Grain-Cleaners; and I do hereby declare the following to be a full, clear, and exact description of the invention, such as will enable others skilled in the art to which it appertains to make and use the same.

My invention relates to those centrifugal grain scourers or cleaners in which is placed a series of scouring pans disposed one above the other so that grain deposited in the upper pan will be thrown out at the periphery thereof and be delivered by gravity into a chute which directs its downward course back upon the inner portion of the next succeeding pan below, and so on to the bottom of the series. The grain in its descent meets an upward current of cleansing air which draws out the dust and large portions of extraneous matter, discharging it at the top of the machine. In such machines it has been proposed to deliver an upward current of fresh air to each pan independently through a central air flue having separate discharge openings leading into each pan, whereby the vitiated air passes into and out of each pan and thence from the machine without again passing through the grain.

My purpose is to provide a machine for accomplishing the results above stated by mechanism which will be much cheaper, stronger and better in numerous ways than that hitherto devised.

To this end my invention consists in the peculiarities more fully described hereinafter and pointed out in the claims.

The accompanying drawings represent a vertical section through my complete apparatus wherein the letter $a$ represents a series of overlapping concentric cylinders nested one within the other, and serving as deflectors for the upward current of air. The smallest cylinder is at the top and the largest at the bottom, with intervening circular discharge air spaces $d$ between them. The whole set of assembled cylinders have the general outline of a cone, and they surround a hollow revoluble air-shaft $g$ closed at the top and open at the bottom. This shaft is fixed to revolve with two short solid shafts $h, h'$ set in suitable bearings in cross-beams of a frame $i$, and driven by a horizontal pulley $j$. To this hollow revoluble shaft $g$ is secured a vertical series of horizontal pans $b$ which receive the descending grain from funnels $k$, having overlapping annular shields W attached to the inside of the cylinders $a$. The shields protect the inside of the cylinders from the cutting effect of the particles of foreign matter liberated from the descending grain. The hollow air-shaft $g$ is supported by and secured to the lower section of the solid shaft $h$ by a bridge-tree C perforated longitudinally to admit air indicated by the arrows. The ingoing fresh air is drawn upwardly through the hollow shaft $g$ by a suction fan $m$ on solid shaft $h$ and is subdivided and delivered in separate streams to the pans through independent receiving orifices $n$. These orifices are graduated in size according to the size of the pan supplied, the larger ones being at the bottom and the smaller ones at the top of said hollow shaft $g$, thereby allowing a proportionate amount of air to enter each pan. The air passes over and through the grain in each pan and thence up and out through the vertical annular air space $d$ intervening between the cylinders $a$, and thence on through the top of the surrounding chamber L and discharge flue E.

$e$ is a feed chute which receives and delivers the grain to the top pan, and $o$ is a receptacle at the bottom of the series to receive the scoured grain which passes out at the bottom through a discharge chute $p$.

While I have mentioned my device as peculiarly fitted for scouring grain, it is evident that it might be used with equal success in cleaning various other materials.

Briefly described the operation of my apparatus is as follows: The grain is fed into the upper pan $b$ through the feed chute $e$ at a point close to the side of the hollow shaft $g$ and as this shaft is revolving at a considerable speed it throws the grain outward by centrifugal force against the shields W. The downwardly pointing arrows indicate the tortuous course of the grain which after leaving the first pan descends by gravity obliquely inward over the surface of the funnel $k$ to the pan below. From the second pan the grain passes on down to the third pan, and so on throughout the series. As the grain drops off the outer edge of each pan, it is met by the uprushing current of air drawn up through the hollow shaft by the suction fan E, and the lighter extraneous matter which is loosened by the action of centrifugal force is blown upwardly and out through the common waste flue above.

Having thus described my invention, what I claim as new and desire to secure by Letters Patent is:

1. A centrifugal grain scourer provided with a central and vertical revoluble hollow shaft carrying a series of rotary pans and having air inlets leading centrally to each pan, in combination with a series of overlapping cylinders placed one within the other and spaced apart to leave air passages between them, each cylinder surrounding its respective pan with an annular space between the two, and means for forcing a current of air upwardly through the openings in said devices.

2. In a centrifugal grain scourer, a hollow air shaft provided with graduated air inlets and forced draft devices, in combination with a series of graduated pans carried by said shaft, and concentric graduated cylinders surrounding the pans and spaced apart, nested and arranged substantially in the form of a cone.

In testimony whereof I affix my signature, in presence of two witnesses.

FRITZ MÜLLER.

Witnesses:
JEAN GULDEN,
HERMANN HOPPE.